US012641122B2

(12) United States Patent
Clark et al.

(10) Patent No.: US 12,641,122 B2
(45) Date of Patent: May 26, 2026

(54) METHODS FOR GENERATING CLIENT-EXECUTABLE ACTIONS THROUGH TLS PARAMETERS AND DEVICES THEREOF

(71) Applicant: F5, Inc., Seattle, WA (US)

(72) Inventors: John Ray Clark, Bedford, NH (US); Jason R. Adams, Spokane Valley, WA (US); Mudit Tyagi, Camas, WA (US); Judge K. Arora, Eastsound, WA (US)

(73) Assignee: F5, Inc., Seattle, WA (US)

( * ) Notice: Subject to any disclaimer, the term of this patent is extended or adjusted under 35 U.S.C. 154(b) by 84 days.

(21) Appl. No.: 18/373,416

(22) Filed: Sep. 27, 2023

(65) Prior Publication Data

US 2025/0106254 A1     Mar. 27, 2025

(51) Int. Cl.
H04L 9/40 (2022.01)
H04L 65/1045 (2022.01)
G06F 16/3329 (2025.01)

(52) U.S. Cl.
CPC .......... H04L 63/166 (2013.01); H04L 63/062 (2013.01); H04L 63/0807 (2013.01); H04L 63/1425 (2013.01); H04L 63/20 (2013.01); H04L 65/1045 (2022.05); G06F 16/3329 (2019.01)

(58) Field of Classification Search
CPC ............. H04L 65/1045; H04L 67/1004; H04L 63/062; H04L 63/0807
See application file for complete search history.

(56) References Cited

U.S. PATENT DOCUMENTS

| | | | | |
|---|---|---|---|---|
| 7,369,537 | B1 * | 5/2008 | Kirchhoff | ........... H04L 65/1045 |
| | | | | 370/395.5 |
| 10,432,406 | B1 | 10/2019 | Amdahl | |
| 10,951,652 | B1 * | 3/2021 | Sharifi Mehr | ...... H04L 63/0807 |
| 12,107,878 | B1 | 10/2024 | Mathews | |

(Continued)

FOREIGN PATENT DOCUMENTS

| | | |
|---|---|---|
| EP | 3767916 A1 | 1/2021 |
| WO | 2015080661 A1 | 6/2015 |
| WO | 2020140114 A1 | 7/2020 |

OTHER PUBLICATIONS

European Search Report Dated Jan. 13, 2025. European Patent Application No. 24202623.5.

(Continued)

*Primary Examiner* — Barbara B Anyan
(74) *Attorney, Agent, or Firm* — Troutman Pepper Locke LLP

(57) ABSTRACT

Methods, non-transitory computer readable media, network traffic manager apparatuses, and systems that assist with generating client-executable actions with TLS parameters includes receiving a request from a client for establishing a TLS connection to a server, wherein the request comprises TLS parameters for the TLS connection. An identity of the client is determined based on the TLS parameters in the request unique to the client. A recommended client-executable action is generated based on the TLS parameters. The recommended client-executable action is an adjustment of a characteristic of a system of the client. The recommended client-executable action is transmitted to the client.

20 Claims, 4 Drawing Sheets

(56)         References Cited

U.S. PATENT DOCUMENTS

| | | |
|---|---|---|
| 2002/0129236 A1 | 9/2002 | Nuutinen |
| 2013/0080475 A1* | 3/2013 | Gillen ............ G06Q 10/063114 |
| | | 707/E17.022 |
| 2014/0093081 A1* | 4/2014 | Hawkes ................ H04L 63/062 |
| | | 380/270 |
| 2016/0179494 A1* | 6/2016 | Pavlov ................ H04L 67/1004 |
| | | 717/177 |
| 2019/0279073 A1* | 9/2019 | Adibowo ................ G06F 16/93 |
| 2020/0036114 A1 | 1/2020 | Wang |
| 2020/0236114 A1 | 7/2020 | Patil |
| 2021/0382924 A1* | 12/2021 | Aaltonen ............ G06F 16/3329 |
| 2022/0070193 A1 | 3/2022 | Konda |
| 2022/0255839 A1 | 8/2022 | Dhanabalan et al. |
| 2023/0156038 A1 | 5/2023 | Konda |

OTHER PUBLICATIONS

European Search Report for EP 24202604.5. European Patent Office. Search Report. Jan. 21, 2025. Entire Report. The European Search Report for EP24202604.5 cites prior art references that are relevant to the claims of the current U.S. application.

* cited by examiner

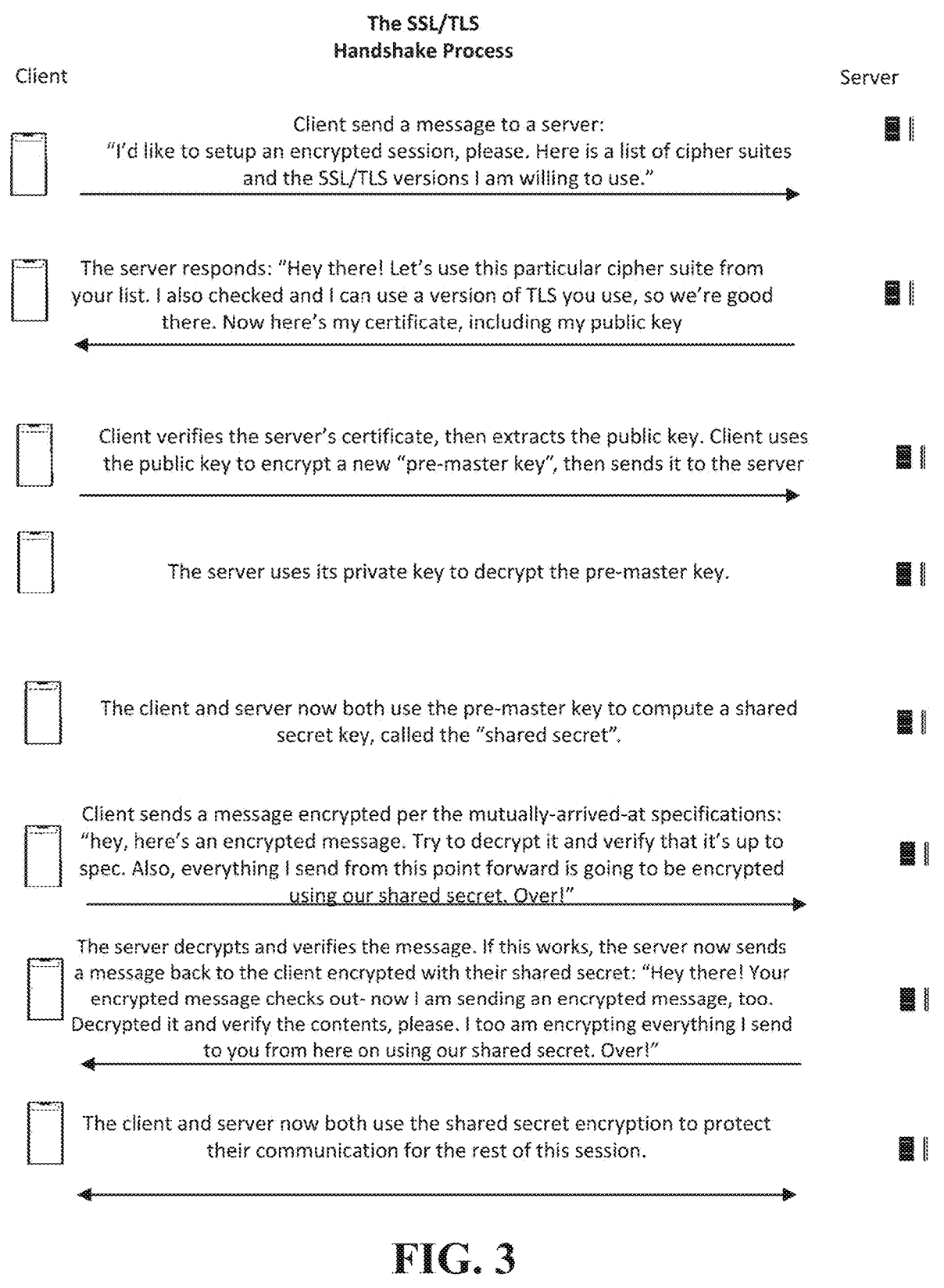

The SSL/TLS
Handshake Process

Client                                                                                               Server Client send a message to a server:
"I'd like to setup an encrypted session, please. Here is a list of cipher suites
and the SSL/TLS versions I am willing to use."

The server responds: "Hey there! Let's use this particular cipher suite from
your list. I also checked and I can use a version of TLS you use, so we're good
there. Now here's my certificate, including my public key Client verifies the server's certificate, then extracts the public key. Client uses
the public key to encrypt a new "pre-master key", then sends it to the server The server uses its private key to decrypt the pre-master key.

The client and server now both use the pre-master key to compute a shared
secret key, called the "shared secret".

Client sends a message encrypted per the mutually-arrived-at specifications:
"hey, here's an encrypted message. Try to decrypt it and verify that it's up to
spec. Also, everything I send from this point forward is going to be encrypted
using our shared secret. Over!"

The server decrypts and verifies the message. If this works, the server now sends
a message back to the client encrypted with their shared secret: "Hey there! Your
encrypted message checks out- now I am sending an encrypted message, too.
Decrypted it and verify the contents, please. I too am encrypting everything I send
to you from here on using our shared secret. Over!"

The client and server now both use the shared secret encryption to protect
their communication for the rest of this session.

FIG. 3

METHODS FOR GENERATING CLIENT-EXECUTABLE ACTIONS THROUGH TLS PARAMETERS AND DEVICES THEREOF

FIELD

This technology relates to methods and systems for generating client-executable actions after identifying a client through TLS parameters from a TLS connection request.

BACKGROUND

Clients often desire the ability to assess risks posed by encrypted network traffic. Network systems handling traffic from the clients can provide insights to clients to assess the risks from the encrypted network traffic, but typically cannot effectively recommend client-executable actions for clients because the encrypted data in the traffic makes assessments opaque. As a result, necessary client-executable actions cannot be recommended or otherwise generated.

SUMMARY

A method for generating recommended client-executable actions through TLS parameters, implemented in cooperation with a network traffic management system comprising one or more network traffic management modules, server modules, or client modules, includes receiving a request from a client for establishing a TLS connection to a server, wherein the request comprises TLS parameters for the TLS connection. An identity of the client is determined based on the TLS parameters in the request unique to the client. A recommended client-executable action is generated based on the TLS parameters. The recommended client-executable action is an adjustment of a characteristic of a system of the client. The recommended client-executable action is transmitted to the client.

A network traffic management apparatus including memory including programmed instructions stored thereon and one or more processors configured to be capable of executing the stored programmed instructions to receive a request from a client for establishing a TLS connection to a server, wherein the request comprises TLS parameters for the TLS connection. An identity of the client is determined based on the TLS parameters in the request unique to the client. A recommended client-executable action is generated based on the TLS parameters. The recommended client-executable action is an adjustment of a characteristic of a system of the client. The recommended client-executable action is transmitted to the client.

A non-transitory computer readable medium having stored thereon instructions for including executable code that, when executed by one or more processors, causes the processors to receive a request from a client for establishing a TLS connection to a server, wherein the request comprises TLS parameters for the TLS connection. An identity of the client is determined based on the TLS parameters in the request unique to the client. A recommended client-executable action is generated based on the TLS parameters. The recommended client-executable action is an adjustment of a characteristic of a system of the client. The recommended client-executable action is transmitted to the client.

A network traffic management system includes one or more traffic management modules, server modules, or client modules, memory comprising programmed instructions stored thereon, and one or more processors configured to be capable of executing the stored programmed instructions to receive a request from a client for establishing a TLS connection to a server, wherein the request comprises TLS parameters for the TLS connection. An identity of the client is determined based on the TLS parameters in the request unique to the client. A recommended client-executable action is generated based on the TLS parameters. The recommended client-executable action is an adjustment of a characteristic of a system of the client. The recommended client-executable action is transmitted to the client.

This technology provides a number of advantages including providing methods, non-transitory computer readable media, network traffic management apparatuses, and network traffic management systems that help to increase performance and security of a client at a client device communicating with a network managing encrypted traffic from the client. Examples of this technology are able to identify a client based on parameters of a TLS handshake message and then based on that identification of the client can determine any necessary client-executable actions. Accordingly, an example of this technology is able to help the client identify vulnerabilities and risks from the encrypted traffic more quickly and efficiently.

BRIEF DESCRIPTION OF THE DRAWINGS

FIG. 3 is an illustration of an exemplary TLS or SSL connection process; and

DETAILED DESCRIPTION

Figure 1:
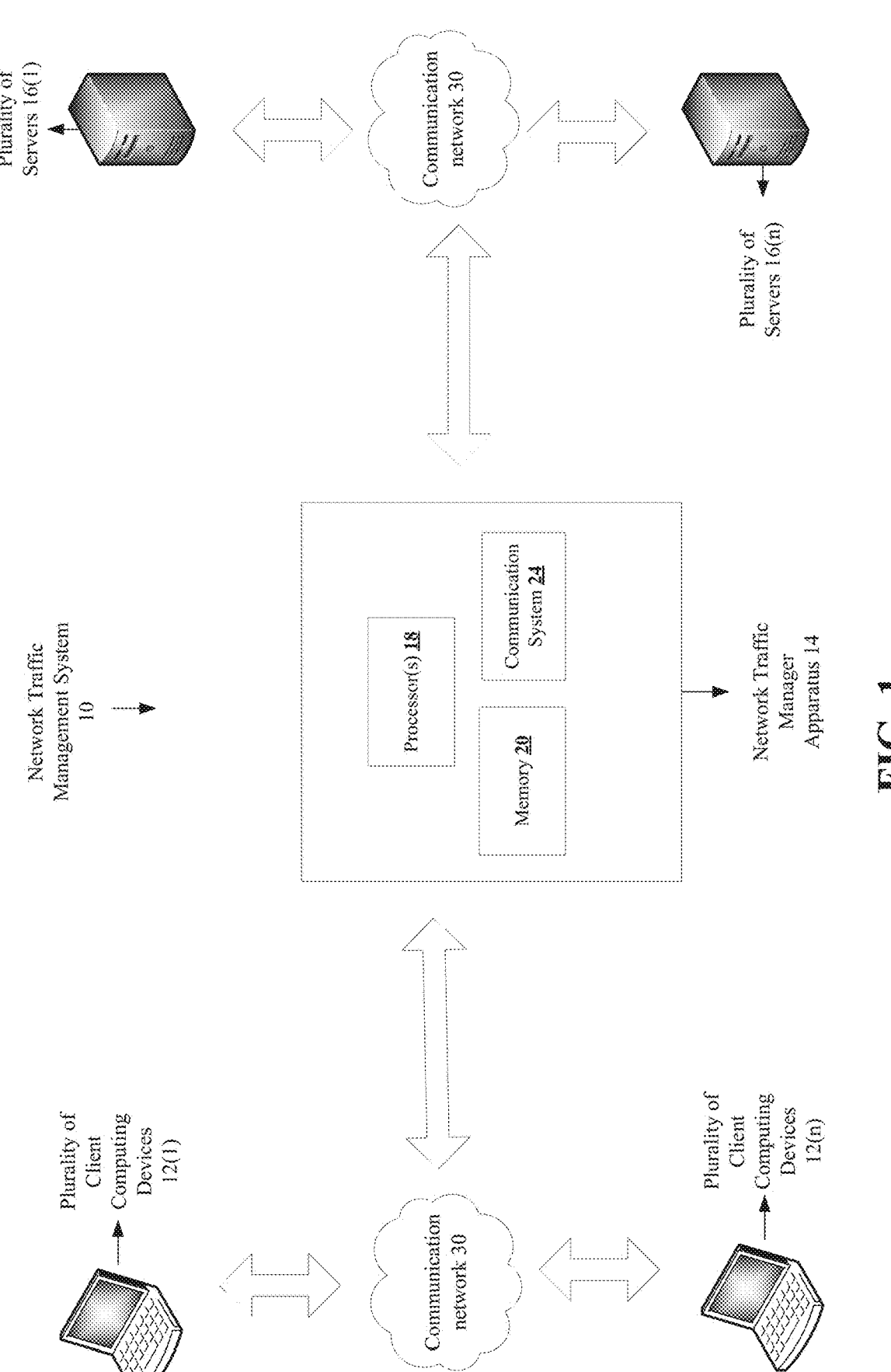
FIG. 1 is block diagrams of an exemplary network traffic management system with a network traffic management apparatus.

An example of a network environment 10 which incorporates a network traffic management system for generating recommended client-executable actions with the network traffic manager apparatus 14 is illustrated in FIG. 1. The exemplary environment includes a plurality of client computing devices 12(1)-12(n), a network traffic manager apparatus 14, and a plurality of servers 16(1)-16(n) which are coupled together by communication networks 30, although the environment can include other types and numbers of systems, devices, components, and/or elements and in other topologies and deployments.

Referring more specifically to FIG. 1, the network traffic manager apparatus 14 of the network traffic management system is coupled to the plurality of client computing devices 12(1)-12(n) through the communication network 30, although the plurality of client computing devices 12(1)-12(n) and network traffic manager apparatus 14 may be coupled together via other topologies. Additionally, the network traffic manager apparatus 14 is coupled to the plurality of servers 16(1)-16(n) through the communication network 30, although the plurality of servers 16(1)-16(n) and the network traffic manager apparatus 14 may be coupled together via other topologies. While not shown, the exemplary environment may include additional network components, such as routers, switches, and other devices, which are well known to those of ordinary skill in the art and thus will not be described here. The communication network

30 can be a wide area network (WAN) or a local area network (LAN). Other network devices configured to generate, send, and receive network communications can be used.

In one such example, at least one network traffic management apparatus 14 is disposed on a client side of a WAN as associated with a LAN connecting many client computing devices 12(1)-12(n). Although network traffic management apparatus 14 is shown in this example, the environment may be coupled in other configurations.

The network traffic manager apparatus 14 assists with generating client-executable actions as illustrated and described by way of the examples herein, although the network traffic manager apparatus 14 may perform other types and/or numbers of functions. As an example, the network traffic manager apparatus 14 may perform directing, optimizing, securing, and accelerating the network traffic between the client computing devices 12(1)-12(n) and the plurality of servers 16(1)-16(n). As illustrated in FIG. 1, the network traffic manager apparatus 14 includes at least one processor or central processing unit (CPU) 18, memory 20, and a communication system 24 which are coupled together by a bus device although the network traffic manager apparatus 14 may comprise other types and numbers of elements in other configurations. In this example, the bus is a PCI Express bus in this example, although other bus types and links may be used.

Each of the client computing devices 12(1)-12(n) and each of the plurality of servers 16(1)-16(n) include a central processing unit (CPU) or processor 18, a memory 22, an interface device, and an I/O system, which are coupled together by a bus or other link, although other numbers and types of network devices could be used. The client computing devices 12(1)-12(n) may run interface applications, such as Web browsers, that may provide an interface to make requests for and send content and/or data to applications or services provided by the server computing devices 20(1)-20(n) via the communication network 30, LANs and/or WAN using the network traffic manager apparatus 14.

In some examples, the network traffic manager apparatus 14 can be a proxy that sits between the plurality of servers 16(1)-16(n) and the plurality of client computing devices 12(1)-12(n). In one example, the proxy may be a third-party interposed between one of the plurality of client computing devices 12(1)-12(n) and one of the plurality of servers 16(1)-16(n) (or network traffic manager apparatus 14). Generally, the plurality of servers 16(1)-16(n) process requests received from the network traffic manager apparatus 14, that is sent to the network traffic manager apparatus 14 from the client computing devices 12(1)-12(n) via the communication network 30 such as the LANs and/or WAN according to the HTTP-based application RFC protocol or the CIFS or NFS protocol for example. Various network processing applications, such as CIFS applications, NFS applications, HTTP Web Server computing device applications, and/or FTP applications, may be operating on the plurality of servers 16(1)-16(n) and transmitting data (e.g., files, Web pages) to the network traffic manager apparatus 14 in response to requests from the network traffic manager apparatus 14.

The processors 18 within the network traffic manager apparatus 14 may execute one or more computer-executable instructions stored in memory 20 for the methods illustrated and described with reference to the examples herein, although the processor 18 can execute other types and numbers of instructions and perform other types and numbers of operations. The processor 18 may comprise one or more central processing units ("CPUs") or general purpose processors with one or more processing cores, such as AMD® processor(s), although other types of processor(s) could be used (e.g., Intel®).

Figure 2:
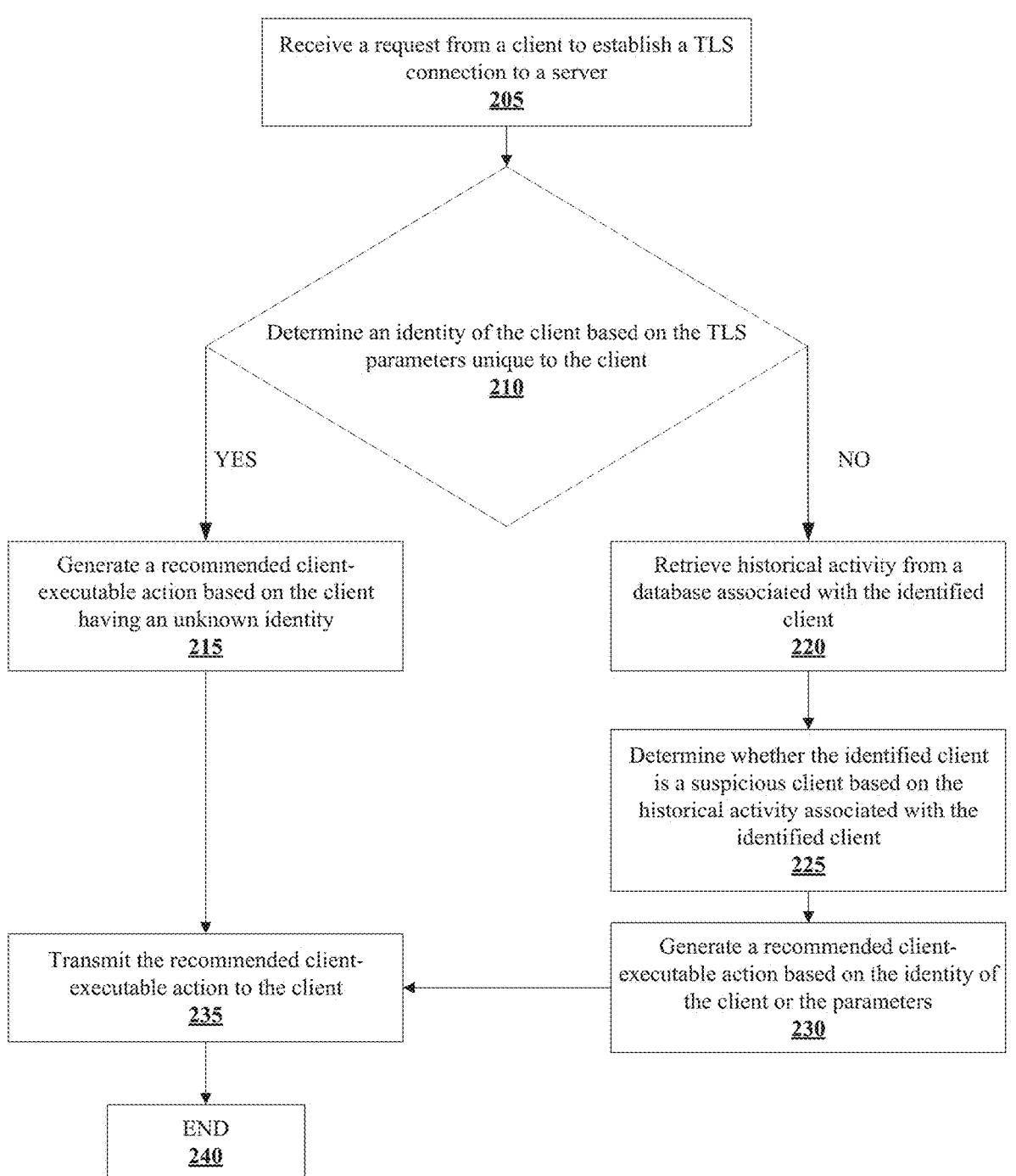
FIG. 2 is a flowchart of an exemplary method for generating recommended client-executable actions from TLS parameters.
Figure 4:
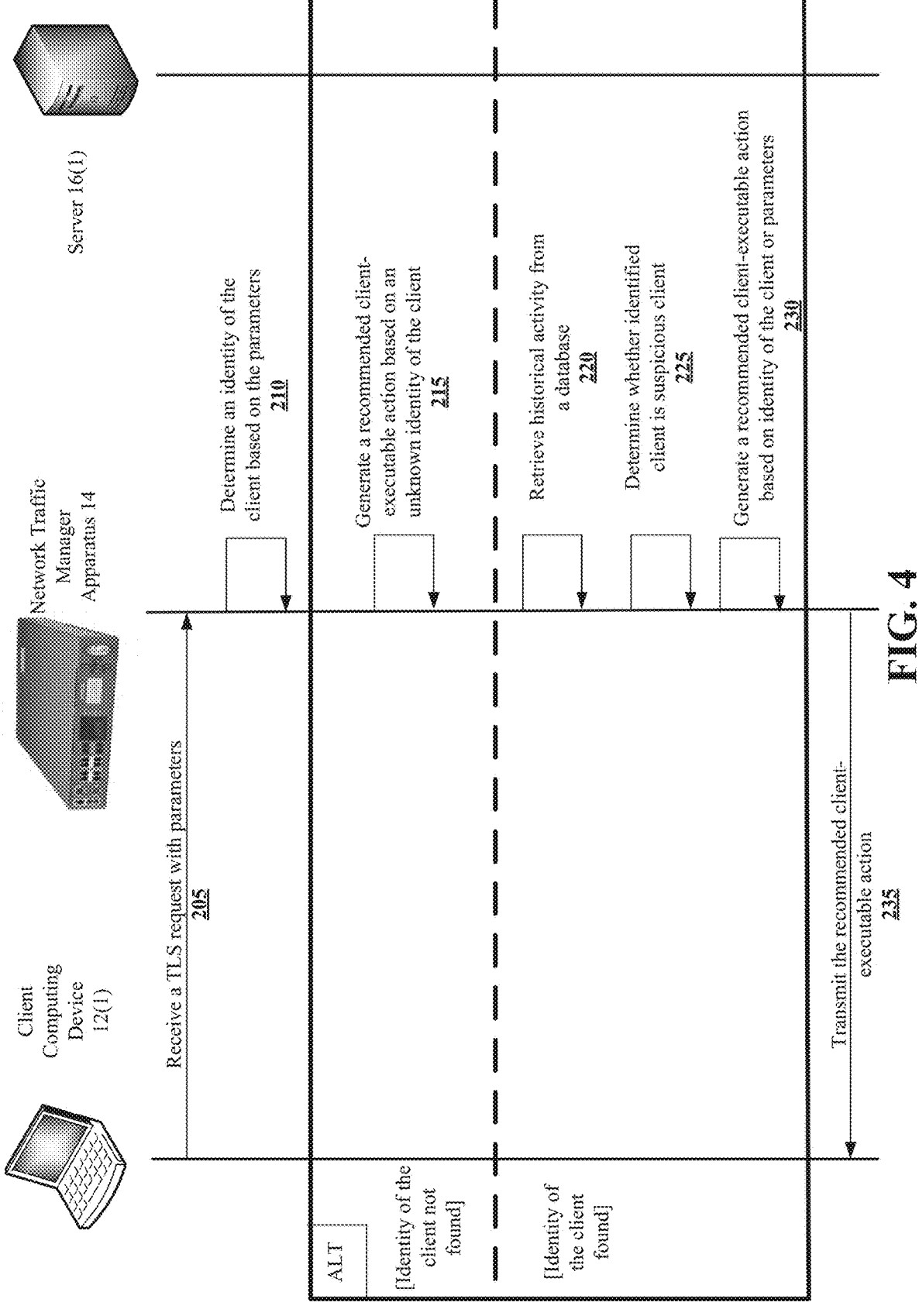
FIG. 4 is an exemplary sequence flow diagram illustrating the method for generating recommended client-executable actions from TLS parameters.

The memory 20 within the network traffic manager apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the processor 18. The exemplary flows shown in FIGS. 2 and 4 are representative of example steps or actions of this technology that may be embodied or expressed as one or more non-transitory computer or machine readable instructions stored in the memory 20 that may be executed by the processor 18.

Accordingly, the memory 20 of the network traffic manager apparatus 14 can store one or more applications that can include computer executable instructions that, when executed by the network traffic manager apparatus 14, causes the network traffic manager apparatus 14 to perform actions, such as to transmit, receive, or otherwise process messages, for example, and to perform other actions described and illustrated below with reference to FIGS. 2 and 4. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the network traffic manager apparatus 14 itself, may be located in virtual server(s) running in a cloud-based computing environment rather than being tied to one or more specific physical network computing devices. Also, the application(s) may be running in one or more virtual machines (VMs) executing on the network traffic manager apparatus 14. Additionally, in at least one of the various examples, virtual machine(s) running on the network traffic manager apparatus 14 may be managed or supervised by a hypervisor.

The communication system in the network traffic manager apparatus 14 is used to operatively couple and communicate between the network traffic manager apparatus 14, the plurality of client computing devices 12(1)-12(n), and the plurality of servers 16(1)-16(n) which are all coupled together by communication network 30 such as one or more local area networks (LAN) and/or the wide area network (WAN), although other types and numbers of communication networks 30 or systems with other types and numbers of connections and configurations to other devices and elements may be used. By way of example only, the communication network 30 such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus is a PCI Express bus in this example, although other bus types and links may be used. The LANs in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The WAN may comprise any wide area network (e.g., Internet), although any other type of traffic network topology may be used.

Each of the plurality of client computing devices 12(1)-12(n) of the network traffic management system 10, include a central processing unit (CPU) or processor 18, a memory, input/display device interface, and an input/output system or I/O system, which are coupled together by a bus or other link. The plurality of client computing devices 12(1)-12(n), in this example, may run interface applications that may provide an interface to make requests for and send and/or receive data to and/or from the plurality of servers 16(1)-16(n) via the network traffic manager apparatus 14. Additionally, the plurality of client computing devices 12(1)-12(n) can include any type of computing device that can receive, render, and facilitate user interaction, such as client computers, network computer, mobile computers, mobile phones, virtual machines (including cloud-based computer), or the like. Each of the plurality of client computing devices 12(1)-12(n) utilizes the network traffic manager apparatus 14 to conduct one or more operations with the plurality of servers 16(1)-16(n).

Each of the plurality of servers 16(1)-16(n) of the network traffic management system include a central processing unit (CPU) or processor 18, a memory, and a communication system 24, which are coupled together by a bus or other link, although other numbers and/or types of network devices could be used. Generally, the plurality of servers 16(1)-16(n) may include any computing device capable of communicating packets to another network device. Each packet may convey a piece of information. A packet may be sent for handshaking, e.g., to establish a connection or to acknowledge receipt of data. The packet may include information such as a request, a response, or the like. Generally, packets received by the plurality of servers 16(1)-16(n) may be formatted according to TCP/IP, but they could also be formatted using another protocol, such as SCTP, X.25, NetBEUI, IPX/SPX, token ring, similar IPv4/6 protocols, and the like. Moreover, the packets may be communicated between the plurality of servers 16(1)-16(n), the plurality of client computing devices 12(1)-12(n), and the network traffic management system 10 employing HTTP, HTTPS, and the like. It is to be understood that the plurality of servers 16(1)-16(n) may be hardware or software or may represent a system with multiple external resource servers, which may include internal or external networks. In one example, the plurality of servers 16(1)-16(n) are configured to operate as a website server. However, the plurality of servers 16(1)-16(n) are not limited to web server devices, and may also operate a messaging server, a File Transfer Protocol (FTP) server, a database server, content server, and the like. Additionally, each of the plurality of servers 16(1)-16(n) may be configured to perform a different operation. Thus, for example, server 16(1) may be configured as a messaging server, while server 16(n) is configured as a database server. Moreover, while the plurality of servers 16(1)-16(n) may operate as other than a website, they may still be enabled to receive an HTTP communication or a TLS communication. Devices that may operate as plurality of servers 16(1)-16(n) include personal computers, desktop computers, multiprocessor systems, microprocessor-based or programmable consumer electronics, network PCs, server devices, and the like.

Although the plurality of servers 16(1)-16(n) are illustrated as single servers, each of the plurality of servers 16(1)-16(n) may be distributed across one or more distinct network computing devices. Moreover, the plurality of servers 16(1)-16(n) are not limited to a particular configuration. Thus, the plurality of servers 16(1)-16(n) may contain a plurality of network computing devices that operate using a master/slave approach, whereby one of the network computing devices of the plurality of servers 16(1)-16(n) operate to manage and/or otherwise coordinate operations of the other network computing devices. The plurality of servers 16(1)-16(n) may operate as a plurality of network computing devices within cluster architecture, a peer-to peer architecture, virtual machines, or within a cloud architecture. The plurality of servers 16(1)-16(n) can include a processing unit, video display adapters, and a mass memory, all in communication with each other via a bus. The mass memory generally includes RAM, ROM, and one or more permanent mass storage devices, such as hard disk drive, tape drive, CD-ROM/DVD-ROM drive, and/or floppy disk drive. The mass memory can store an operating system for controlling the operation of the plurality of servers 16(1)-16(n). Any general-purpose operating system may be employed. Basic input/output system ("BIOS") can be also provided for controlling the low-level operation of the plurality of servers 16(1)-16(n). The plurality of servers 16(1)-16(n) also can communicate with the Internet, or some other communications network, via network interface unit 310, which is constructed for use with various communication protocols including the TCP/IP protocol.

Thus, the technology disclosed herein is not to be construed as being limited to a single environment and other configurations and architectures are also envisaged. For example, the one or more of the plurality of servers 16(1)-16(n) depicted in FIG. 1 can operate within network traffic manager apparatus 14 rather than as a standalone server communicating with network traffic manager apparatus 14 via the communication network(s) 30. In this example the plurality of servers 16(1)-16(n) operate within the memory 20 of the network traffic manager apparatus 14. Additionally, as illustrated in FIG. 4, one of the plurality of servers (16)(1)-16(n) can be used to implement the technology disclosed herein.

While the network traffic manager apparatus 14 is illustrated in this example as including a single device, the network traffic manager apparatus 14 in other examples can include a plurality of devices or blades each with one or more processors 18 each processor 18 with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise network traffic manager apparatus 14 in other examples can be standalone devices or integrated with one or more other devices or applications, plurality of servers 16(1)-16(n) or, the network traffic manager apparatus 14, or applications coupled to the communication network(s) 30, for example. Moreover, one or more of the devices of the network traffic manager apparatus 14 in these examples can be in a same or a different communication network 30 including one or more public, private, or cloud networks, for example.

Although an exemplary network traffic management system 10 with the plurality of client computing devices 12(1)-12(n), the network traffic manager apparatus 14, and the plurality of servers 16(1)-16(n), communication networks 30, LANS, WAN, are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described, and illustrated herein, and as will be appreciated by those of ordinary skill in the art.

One or more of the components depicted in the network traffic management system, such as the network traffic manager apparatus 14, the plurality of client computing devices 12(1)-12(n), the plurality of servers 16(1)-16(n), for example, may be configured to operate as virtual instances on the same physical machine. In other words, one or more of network traffic manager apparatus 14, the plurality of client computing devices 12(1)-12(n), or the plurality of servers 16(1)-16(n) illustrated in FIG. 1 may operate on the same physical device rather than as separate devices communicating through a network as depicted in FIG. 1. There may be more or fewer plurality of client computing devices 12(1)-12(n), network traffic manager apparatus 14, or the plurality of servers 16(1)-16(n) than depicted in FIG. 1. The plurality of client computing devices 12(1)-12(n), the plurality of servers 16(1)-16(n) could be implemented as applications on network traffic manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An example of a method for generating client-executable actions from TLS parameters will now be described with reference to FIGS. 2-4. First in step 205, the network traffic manager apparatus 14 receives a request from one of the client computing devices 12(1)-12(n) to establish a connection. In some examples, the request can be a security handshake from the one of the client computing devices 12(1)-12(n). The security handshake in some examples can be received for establishing a connection to a server. In some examples, the security handshake can be a Transport Layer Security (TLS) handshake or a Secure Socket Layer (SSL) handshake for establishing a current SSL connection to a server. The SSL protocol is described in Netscape Communications Corp, Secure Sockets Layer version 3 (November 1996), and the TLS protocol is derived from SSL, and is described in Dierks, T., and Allen, C., "The TLS Protocol Version 1.0," RFC 2246 (January 1999), available from the IETF. The DTLS protocol is based on the TLS protocol, and is described in Rescorla, E., and Modadugu, N., "Datagram Transport Layer Security," RFC 4347 (April 2006), available from the IETF. Each of these documents is incorporated herein by reference in their entirety. An TLS/SSL connection is a connection that is secured by cryptographic information derived from a TLS/SSL protocol. The SSL protocol operates between an application layer (such as one or more of OSI layers 5-7) and a transport layer (such as OSI layer 4). The SSL protocol may provide security for application layer protocols such as HyperText Transfer Protocol (HTTP), Lightweight Directory Access Protocol (LDAP), Internet Messaging Access Protocol (IMAP), or the like. For example, HTTP over SSL (HTTPS) utilizes the SSL protocol to secure HTTP data. The SSL protocol may utilize Transport Control Protocol/Internet Protocol (TCP/IP) on behalf of the application layer protocols to transport secure data.

A TLS/SSL session refers to a secure session between two endpoints, wherein the session is secured using the TLS/SSL protocol. Although an TLS/SSL session is generally described herein as being established between one of the client computing devices 12(1)-12(n) and one of the servers 16(1)-16(n) over a communication network 30, it should be understood that a TLS or an SSL session may be established between virtually any types of network devices enabled to employ the TLS/SSL protocol. The TLS protocol uses a series of TLS handshakes (i.e., an TLS handshake protocol) to initiate an TLS session. The SSL protocol uses a series of SSL handshakes (i.e., an SSL handshake protocol) to initiate an SSL session. An SSL session is associated with a master secret (also known as a session key) that results from the SSL handshakes. An SSL session is further associated with additional secret data that enables the SSL session (e.g., pre-master secret, random data, server's public and private keys and/or client's public and private keys). The TLS/SSL protocol also includes an TLS/SSL re-handshake procedure for renegotiating an TLS/SSL session. The renegotiated TLS/SSL session may be associated with the current. TLS/SSL session or with another TLS/SSL session. An TLS/SSL session may employ one or more underlying network connections.

In some examples, the TLS/SSL connection may be established between one of the client computing devices 12(1)-12(n) and the network traffic manager apparatus 14 that operates on behalf of the plurality of servers 16(1)-16(n). In some examples, the network traffic manager apparatus 14 can be a proxy that sits between the plurality of servers 16(1)-16(n) and the plurality of client computing devices 12(1)-12(n). In one example, the proxy may be a third-party interposed between one of the client computing devices 12(1)-12(n) and one of the servers 16(1)-16(n) (or network traffic manager apparatus 14). SSL handshake messages or TLS handshake messages are sent between one of the client computing devices 12(1)-12(n) and the network traffic manager apparatus 14, then from the network traffic manager apparatus 14 to the server 16(1) to establish the SSL/TLS connection. As the handshake messages are forwarded through the proxy, the proxy may extract data such as parameters from at least one of the TLS handshake messages.

In step 210, the network traffic manager apparatus 14 determines an identity of the client at the one of the client computing devices 12(1)-12(n) based on TLS parameters in the request unique to the client at the one of the client computing devices 12(1)-12(n). Some example of TLS parameters in the art which may be used in the identification of the client at the one of the client computing devices 12(1)-12(n) are described in "Transport Layer Security (TLS) Parameters," Internet Assigned Numbers Authority (September 2023), https://www.iana.org/assignments/tls-parameters/tls-parameters.xhtml. This document is incorporated herein by reference in their entirety. The parameters for the TLS connection can be a unique combination used by a client at one of the client computing devices 12(1)-12(n) and can help serve as a fingerprint of the client at the one of the client computing devices 12(1)-12(n) to determine the identity of the client. The network traffic manager apparatus 14 may be able to access a database with known clients mapped to combination of parameters unique to each known client to determine an identification of the client at the one of the client computing devices 12(1)-12(n), although other approaches can be used. If the network traffic manager apparatus 14 is not able to determine the identity of the client at the one of the client computing devices 12(1)-12(n) from the TLS parameters in the request, then the No branch is taken to step 215.

In step 215, if the identity of the client at the one of the client computing devices 12(1)-12(n) is not determined and then the network traffic manager apparatus 14 identifies the client at the one of the client computing devices 12(1)-12(n) as an unknown identity and generates a recommended client-executable action based on the client at the one of the client computing devices 12(1)-12(n) being identified as an unknown identity. By way of example, the recommended client-executable action can be a recommended client-executable security action to increase security of the network, although other types of client-executable actions can be recommended. Examples of client-executable security actions that can be recommended to increase security of the network will now be described below.

In some examples, the security action can be recommending redirecting the request through a different traffic path or specific hardware or server. The network traffic manager apparatus 14 can generate a list of a subset of servers from the servers 16(1)-16(n), where the subset of servers are vulnerable servers or botnet endpoints. The vulnerable servers or botnet endpoints can be selected based on historical activity of other clients with the servers 16(1)-16(n). The network traffic manager apparatus 14 can then transmit the list of vulnerable servers or botnet endpoints to the client at the one of the client computing devices 12(1)-12(n) with a recommendation to avoid directing traffic through the list of vulnerable servers or botnet endpoints.

In other examples, the network traffic manager apparatus 14 can recommend altering an encryption policy a system of the client at one of the client computing devices 12(1)-12(n). The network traffic manager apparatus 14 can also recommend adding another encryption algorithm or altering an encryption algorithm of the client at one of the client computing devices 12(1)-12(n). In other examples, the recommended client-executable action can be to update a version of TLS handshake messages or update a version of a protocol of the system of the client at one of the client computing devices 12(1)-12(n).

In other examples, the identification of the client at the one of the client computing devices 12(1)-12(n) as an unknown client can be classified into a predetermined category, and the network traffic manager apparatus 14 can recommend a modification of a treatment of a plurality of subsequent requests from the unknown client can be based on the predetermined category. As a non-limiting example, the predetermined category for unknown clients can be a category based on the ID in the request and the treatment of the plurality of subsequent requests from the client at the one of the client computing devices 12(1)-12(n) can be to direct the plurality of subsequent requests through a specific hardware.

If back in step 210, the network traffic manager apparatus 14 is able to determine the identity of the client at the one of the client computing devices 12(1)-12(n), then the Yes branch is taken to step 220. In step 220, if the identity of the client at the one of the client computing devices 12(1)-12(n) is determined, then the network traffic manager apparatus 14 can retrieve historical activity associated with the identified client from a database. The historical activity can comprise of historical requests or historical transactions of the identified client, although other types of historical data may be used. The historical requests and historical transactions can comprise system information of the client at the one of the client computing devices 12(1)-12(n).

In step 225, if the network traffic manager apparatus 14 can determine whether the identified client at the one of the client computing devices 12(1)-12(n) is a suspicious client based on the historical activity associated with the identified client. The network traffic manager apparatus 14 can inspect the historical activity associated with the identified client to determine a level of scrutiny to give the request or the subsequent request from the client by analyzing the system information in the historical requests and the historical transactions. In some embodiments, the network traffic manager apparatus 14 can categorize the client at the one of the client computing devices 12(1)-12(n) as a suspicious client when the network traffic manager apparatus 14 determines that the level of scrutiny should be high. The network traffic manager apparatus 14 can generate the recommended client-executable security actions described above when the client at the one of the client computing devices 12(1)-12(n) is a suspicious client or has the level of scrutiny set as high.

In step 230, the network traffic manager apparatus 14 generates a recommended client-executable action based on the identity of the client at the one of the client computing devices 12(1)-12(n). When the network traffic manager apparatus 14 accesses the database of known clients and identifies the client, the network traffic manager apparatus 14 can then determine the level of scrutiny for the request or can determine whether the client is suspicious using the historical activity of the client. When the network traffic manager apparatus 14 accesses the database and the client is not in the database of known clients, then the network traffic manager apparatus 14 can use the TLS parameters of the request to determine the level of scrutiny for the request or can determine whether the client at the one of the client computing devices 12(1)-12(n) is suspicious. When the network traffic manager apparatus 14 determines that the client at the one of the client computing devices 12(1)-12(n) is not a suspicious client or does not have the level of scrutiny set as high, the network traffic manager apparatus 14 can generate recommended client-executable actions to assist the client at the one of the client computing devices 12(1)-12(*n*) to increase the of the system of the client at the one of the client computing devices 12(1)-12(*n*) as described below.

In some examples, the network traffic manager apparatus 14 can recommend any of the recommended client-executable actions outlined in step 215 above. In other examples, the network traffic manager apparatus 14 can transmit the historical activity associated with the identified client to the client at the one of the client computing devices 12(1)-12(*n*) for the client at the one of the client computing devices 12(1)-12(*n*) to analyze. In other examples, the network traffic manager apparatus 14 can analyze the historical activity associated with the identified client and system information from the TLS parameters for patterns. The network traffic manager apparatus 14 can identify patterns such as resources attempted to access, speed or method of accessing the resources, and other data known in the art that can be used to determine if a client is suspicious.

In step 235, the network traffic manager apparatus 14 transmits the recommended client-executable action and the exemplary process ends at step 240. The network traffic apparatus can send the request or the subsequent request to the one of the servers 16(1)-16(*n*) after transmitting the recommended client-executable action. In some examples, after sending the request to the server, the network traffic manager apparatus 14 can receive a message from the one of the servers 16(1)-16(*n*) indicating that the transaction or handshake is complete. The network traffic manager apparatus 14 can then receive additional messages from the one of the client computing devices 12(1)-12(*n*) and send the received additional messages to the one of the servers 16(1)-16(*n*). The network traffic manager apparatus 14 can also receive additional messages from the one of the servers 16(1)-16(*n*) and send the received additional messages to the client computing device 12(1).

Having thus described the basic concept of the technology, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations, therefore, is not intended to limit the claimed processes to any order except as may be specified in the claims. Accordingly, the technology is limited only by the following claims and equivalents thereto.

What is claimed is:

1. A method for generating client-executable actions for an identified client, the method implemented by a network traffic management system comprising one or more network traffic apparatuses, client devices, or server devices, the method comprising:

receiving a request from a client for establishing a TLS connection to a server, wherein the request comprises TLS parameters for the TLS connection;

determining an identity of the client based on the TLS parameters in the request unique to the client by comparing the TLS parameters in the request to a database with known clients mapped to unique combinations of TLS parameters to identify a matching client in the database with a same combination of TLS parameters;

generating a recommended client-executable action based on the TLS parameters, wherein the recommended client-executable action is an adjustment of a characteristic of a system of the client; and transmitting the recommended client-executable action to the client.

2. The method as set forth in claim 1, further comprising:

retrieving historical activity from a database associated with the identified client, wherein the historical activity comprises historical requests or historical transactions of the identified client; and determining whether the identified client is a suspicious client based on the historical activity associated with the identified client, wherein the recommended client-executable action is a recommended client-executable security action when the identified client is a suspicious client.

3. The method as set forth in claim 2, wherein the recommended client-executable security action comprises changing an encryption policy, altering an encryption algorithm, updating a version of TLS handshake messages.

4. The method as set forth in claim 1, wherein the recommended client-executable action comprises recommending directing the request or a subsequent request from the identified client through specific hardware or a different service chain.

5. The method as set forth in claim 1, wherein the recommended client-executable action comprises recommending a modification of treatment of a plurality of subsequent requests from the identified client based on a predetermined category, wherein the identified client is classified into the predetermined category prior to generating the recommended client-executable action.

6. A non-transitory computer readable medium having stored thereon instructions for establishing a connection to a server with a certificate comprising executable code which when executed by one or more processors, causes the processors to:

receive a request from a client for establishing a TLS connection to a server, wherein the request comprises TLS parameters for the TLS connection;

determine an identity of the client based on the TLS parameters in the request unique to the client by comparing the TLS parameters in the request to a database with known clients mapped to unique combinations of TLS parameters to identify a matching client in the database with a same combination of TLS parameters;

generate a recommended client-executable action based on the TLS parameters, wherein the recommended client-executable action is an adjustment of a characteristic of a system of the client; and transmit the recommended client-executable action to the client.

7. The medium as set forth in claim 6, wherein the executable code which when executed by the processors, further causes the processors to:

retrieve historical activity from a database associated with the identified client, wherein the historical activity comprises historical requests or historical transactions of the identified client; and determine whether the identified client is a suspicious client based on the historical activity associated with the identified client, wherein the recommended client-executable action is a recommended client-executable security action when the identified client is a suspicious client.

8. The medium as set forth in claim 7, wherein the recommended client-executable security action comprises changing an encryption policy, altering an encryption algorithm, updating a version of TLS handshake messages.

9. The medium as set forth in claim 6, wherein the recommended client-executable action comprises recommending directing the request or a subsequent request from the identified client through specific hardware or a different service chain.

10. The medium as set forth in claim 6, wherein the recommended client-executable action comprises recommending a modification of treatment of a plurality of subsequent requests from the identified client based on a predetermined category, wherein the identified client is classified into the predetermined category prior to generating the recommended client-executable action.

11. A network traffic manager apparatus, comprising memory comprising programmed instructions stored in the memory and one or more processors configured to be capable of executing the programmed instructions stored in the memory to:

receive a request from a client for establishing a TLS connection to a server, wherein the request comprises TLS parameters for the TLS connection;

determine an identity of the client based on the TLS parameters in the request unique to the client by comparing the TLS parameters in the request to a database with known clients mapped to unique combinations of TLS parameters to identify a matching client in the database with a same combination of TLS parameters;

generate a recommended client-executable action based on the TLS parameters, wherein the recommended client-executable action is an adjustment of a characteristic of a system of the client; and transmit the recommended client-executable action to the client.

12. The device as set forth in claim 11, wherein the one or more processors are further configured to be capable of executing the programmed instructions stored in the memory to:

retrieve historical activity from a database associated with the identified client, wherein the historical activity comprises historical requests or historical transactions of the identified client; and determine whether the identified client is a suspicious client based on the historical activity associated with the identified client, wherein the recommended client-executable action is a recommended client-executable security action when the identified client is a suspicious client.

13. The device as set forth in claim 12, wherein the recommended client-executable security action comprises changing an encryption policy, altering an encryption algorithm, updating a version of TLS handshake messages.

14. The device as set forth in claim 11, wherein the recommended client-executable action comprises recommending directing the request or a subsequent request from the identified client through specific hardware or a different service chain.

15. The device as set forth in claim 11, wherein the recommended client-executable action comprises recommending a modification of treatment of a plurality of subsequent requests from the identified client based on a predetermined category, wherein the identified client is classified into the predetermined category prior to generating the recommended client-executable action.

16. A network traffic management system, comprising one or more traffic management apparatuses, client devices, or server devices, the network traffic management system comprising memory comprising programmed instructions stored thereon and one or more processors configured to be capable of executing the stored programmed instructions to:

receive a request from a client for establishing a TLS connection to a server, wherein the request comprises TLS parameters for the TLS connection;

determine an identity of the client based on the TLS parameters in the request unique to the client by comparing the TLS parameters in the request to a database with known clients mapped to unique combinations of TLS parameters to identify a matching client in the database with a same combination of TLS parameters;

generate a recommended client-executable action based on the TLS parameters, wherein the recommended client-executable action is an adjustment of a characteristic of a system of the client; and transmit the recommended client-executable action to the client.

17. The network traffic management system of claim 16, wherein the one or more processors are further configured to be capable of executing the programmed instructions stored in the memory to:

retrieve historical activity from a database associated with the identified client, wherein the historical activity comprises historical requests or historical transactions of the identified client; and determine whether the identified client is a suspicious client based on the historical activity associated with the identified client, wherein the recommended client-executable action is a recommended client-executable security action when the identified client is a suspicious client.

18. The network traffic management system of claim 17, wherein the recommended client-executable security action comprises changing an encryption policy, altering an encryption algorithm, updating a version of TLS handshake messages.

19. The network traffic management system of claim 16, wherein the recommended client-executable action comprises recommending directing the request or a subsequent request from the identified client through specific hardware or a different service chain.

20. The network traffic management system of claim 16, wherein the recommended client-executable action comprises recommending a modification of treatment of a plurality of subsequent requests from the identified client based on a predetermined category, wherein the identified client is classified into the predetermined category prior to generating the recommended client-executable action.

\* \* \* \* \*